United States Patent
Park

(10) Patent No.: US 6,441,868 B1
(45) Date of Patent: Aug. 27, 2002

(54) IMAGE REPRODUCING APPARATUS HAVING A SCREEN BLANKING FUNCTION AND A SCREEN BLANKING METHOD USING THE SAME

(75) Inventor: Kye-ho Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/122,656

(22) Filed: Jul. 27, 1998

(30) Foreign Application Priority Data

Nov. 17, 1997 (KR) ............................................. 97-60615

(51) Int. Cl.[7] .............................................. H04N 5/63
(52) U.S. Cl. ....................... 348/633; 348/632; 348/730; 348/738; 348/333.13; 348/634; 348/635
(58) Field of Search ................................. 348/633, 569, 348/378, 730, 738, 333.13, 512, 634, 632, 635; 345/211, 212, 215; 713/300, 320, 324; H04N 5/63

(56) References Cited

U.S. PATENT DOCUMENTS

| | | | | |
|---|---|---|---|---|
| 4,641,190 A | * | 2/1987 | Testin et al. | 348/632 |
| 4,641,205 A | * | 2/1987 | Beyers, Jr. | 386/83 |
| 4,748,517 A | * | 5/1988 | Shibata et al. | 386/39 |
| 4,837,623 A | * | 6/1989 | Motoyama | 348/633 |
| 5,467,139 A | * | 11/1995 | Lankford | 348/512 |
| 5,603,058 A | * | 2/1997 | Belknap et al. | 395/855 |
| 5,751,722 A | * | 5/1998 | Maekawa | 348/14.01 |
| 5,821,924 A | * | 10/1998 | Kikinis et al. | 345/212 |
| 5,880,719 A | * | 3/1999 | Kikinis | 348/212 |
| 5,903,395 A | * | 5/1999 | Rallison et al. | 359/630 |
| 5,991,085 A | * | 11/1999 | Rallison et al. | 359/630 |
| 5,999,229 A | * | 12/1999 | Samarughi et al. | 348/633 |
| 6,160,666 A | * | 12/2000 | Rallison et al. | 345/7 |
| 6,205,318 B1 | * | 3/2001 | Schindler et al. | 455/6.3 |

FOREIGN PATENT DOCUMENTS

| | | | | |
|---|---|---|---|---|
| JP | 4-72969 | 3/1992 | | H04N/5/44 |
| JP | 4-78871 | 7/1992 | | H04N/5/44 |
| JP | 7-107405 | 4/1995 | | H04N/5/44 |
| KR | 94-4626 | 2/1994 | | G11B/27/10 |

* cited by examiner

Primary Examiner—John Miller
Assistant Examiner—Linus H. Lo
(74) Attorney, Agent, or Firm—Sughrue Mion, PLLC

(57) ABSTRACT

An image reproducing apparatus having a screen blanking function for suspending image information displayed on a screen and a screen blanking method using the same are provided. The image reproducing apparatus includes a command applying circuit for applying image blanking execution and cancellation codes, a screen blanking determining circuit for determining whether a screen is to be blanked according to a code provided by the command applying circuit, and a screen power controlling circuit for controlling the power supply provided to the screen according to the determined result of the screen blanking determining circuit.

2 Claims, 2 Drawing Sheets

IMAGE REPRODUCING APPARATUS HAVING A SCREEN BLANKING FUNCTION AND A SCREEN BLANKING METHOD USING THE SAME

BACKGROUND OF THE INVENTION

1. Field of the Invention

The present invention relates to an image reproducing apparatus. More particularly, the present invention relates to an image reproducing apparatus that has a screen blanking function which suppresses display of image information on a screen, and a screen blanking method using the same.

2. Summary of the Related Art

Screen blanking refers to the function of suspending power applied to a display unit of an image reproducing apparatus. The result is that image information is not displayed on the screen when a screen blanking code is applied externally.

In general, a sound mute circuit applied to the image reproducing apparatus suspends sound information output from the image reproducing apparatus. The sound mute circuit may be used to reduce noise during external activities such as a telephone call.

FIG. 1 is a block diagram showing the structure of the sound mute circuit applied to an image reproducing apparatus which does not embody the present invention.

The sound mute circuit shown in FIG. 1 includes a sound mute determining unit 10 for determining whether sound is to be muted when a sound mute signal is input from a remote control device and for outputting a control signal corresponding thereto. The sound mute circuit also includes a sound outputting unit 12 for outputting sounds according to the control signal provided by the sound mute determining unit 10.

The sound mute circuit shown in FIG. 1 operates as follows.

When a sound mute execution code is applied, the sound mute determining unit 10 instructs the sound outputting unit 12 to mute the output of sound. When a sound mute cancel code is applied, the sound mute determining unit instructs the sound outputting unit 12 to allow the output of sound.

This mute circuit mutes sound in an image reproducing apparatus. However, a screen blanking function is sometimes required for the following reasons.

During programs such as talk shows or concert performances, the image displayed on the screen barely changes. This bores viewers. In addition, the viewers may desire to listen to the sound without watching the screen depending on the type of program. Because the image displayed on the screen is not watched, power supplied to display the image information on the screen is wasted. Also, when only sounds output from the image reproducing apparatus are recorded on a audio cassette (as distinct from taping both audio and video via a VCR), it is not necessary to watch the screen.

Therefore, when the viewer desires only to listen to the image reproducing apparatus, and does not desire to view the image, an image reproducing apparatus capable of blanking the screen and outputting only sound will avoid unnecessary power consumption.

SUMMARY OF THE INVENTION

It is an object of the present invention to provide an image reproducing apparatus having a screen blanking function that outputs only sounds, which will reduce power consumption by blanking a screen according to the taste of a viewer.

It is another object of the present invention to provide a screen blanking method using the same.

To achieve the first of the above objects, an image reproducing apparatus with a screen blanking function is provided which includes a command applying circuit for implementing image blanking execution and cancellation codes and a screen blanking determining circuit for determining whether a screen is to be blanked according to a code provided by the command applying circuit. The image reproducing apparatus also includes a screen power controlling circuit for controlling the power supply provided to the screen according to the result supplied by the screen blanking determining circuit.

To achieve the second of the above objects, a screen blanking method of an image reproducing apparatus is provided which comprises the steps of: 1) determining the type of code applied; and 2) controlling power to a screen based on said code. The power to the screen is to be suspended when the code applied is a screen blanking execution code, and power to the screen is to be restored when the code is a screen blanking cancellation code.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Figure 1:
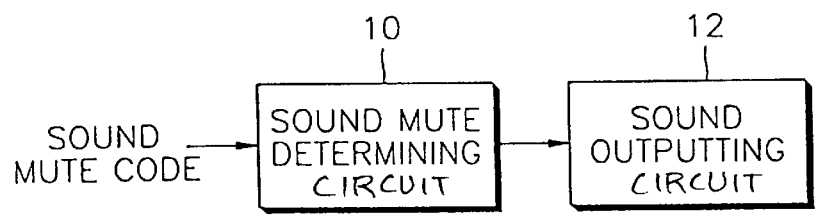
FIG. 1 is a block diagram showing the structure of a sound mute circuit applied to an image reproducing apparatus which does not embody the present invention.
Figure 2:
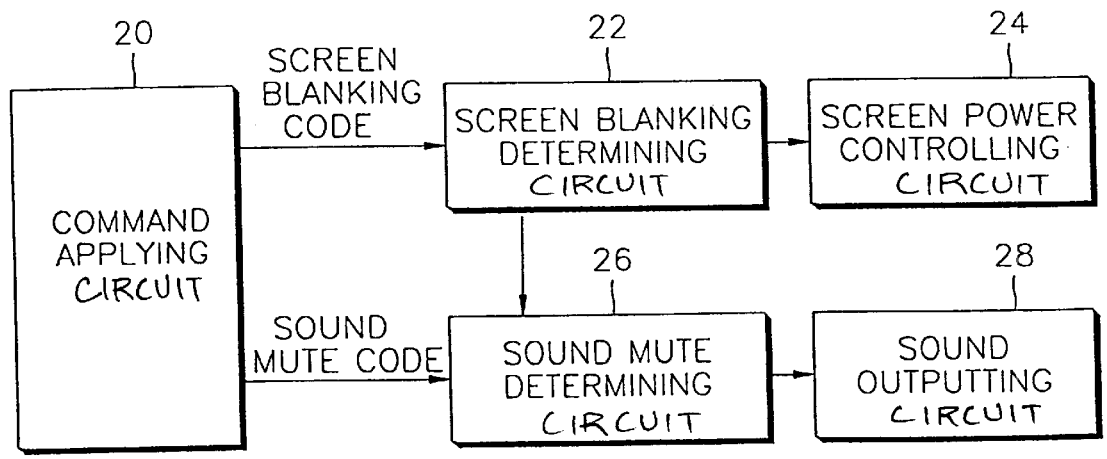
FIG. 2 is a block diagram showing the structure of a screen blanking circuit applied to an image reproducing apparatus according to the present invention.

FIG. 2 is a block diagram showing the structure of a screen blanking circuit applied to an image reproducing apparatus according to the present invention.

The screen blanking circuit shown in FIG. 2 includes a command applying circuit 20, a screen blanking determining circuit 22, a screen power controlling circuit 24, a sound mute determining circuit 26, and a sound mute outputting circuit 28.

The command applying circuit 20 applies screen blanking and sound mute execution/cancellation codes. The screen blanking determining circuit 22 determines whether the screen is to be blanked according to the code provided from the command applying circuit 20. The screen power controlling circuit 24 controls the power supply to the screen according to the result of the screen blanking determining circuit 20. The sound mute determining circuit 26 determines whether sound is to be muted according to the mute code provided by the command applying circuit 20 and the result provided by the screen blanking determining circuit 22. The sound outputting circuit 28 controls the sound output according to the result of the sound mute determining circuit 26.

The apparatus shown in FIG. 2 operates as follows.

The screen blanking determining circuit 22 determines whether a screen blanking execution code is output from the command applying circuit 20. When a screen blanking execution code is output, the screen blanking determining circuit 22 outputs a blanking control signal to the screen power controlling circuit 24. The screen power controlling circuit 24 then suspends the power to the screen. When the screen blanking cancellation code is output from the command applying circuit 20, the screen blanking determining circuit 22 outputs a cancel control signal to the screen power controlling circuit 24. The screen power controlling circuit 24 then restores power to the screen.

In the preferred embodiment, when the screen blanking determining circuit 22 determines that the power supply from the screen power controlling circuit 24 to the screen should be suspended, the sound mute determining circuit 26 maintains the sound to be output from the sound outputting circuit 28 even if a sound mute code is applied from the command applying circuit 20.

The screen blanking code signals supplied by the command applying circuit 20 are divided into a blanking execution code and a blanking cancellation code. The blanking determining circuit 22 senses one key input for the blanking code as a blanking execution code and another key input as a blanking cancellation code. The sound mute code signals supplied by the command applying circuit 20 are divided into a mute execution code and a mute cancellation code. The mute determining circuit 26 senses one key input for the mute code as a mute execution code and another key input as a mute cancellation code.

Figure 3:
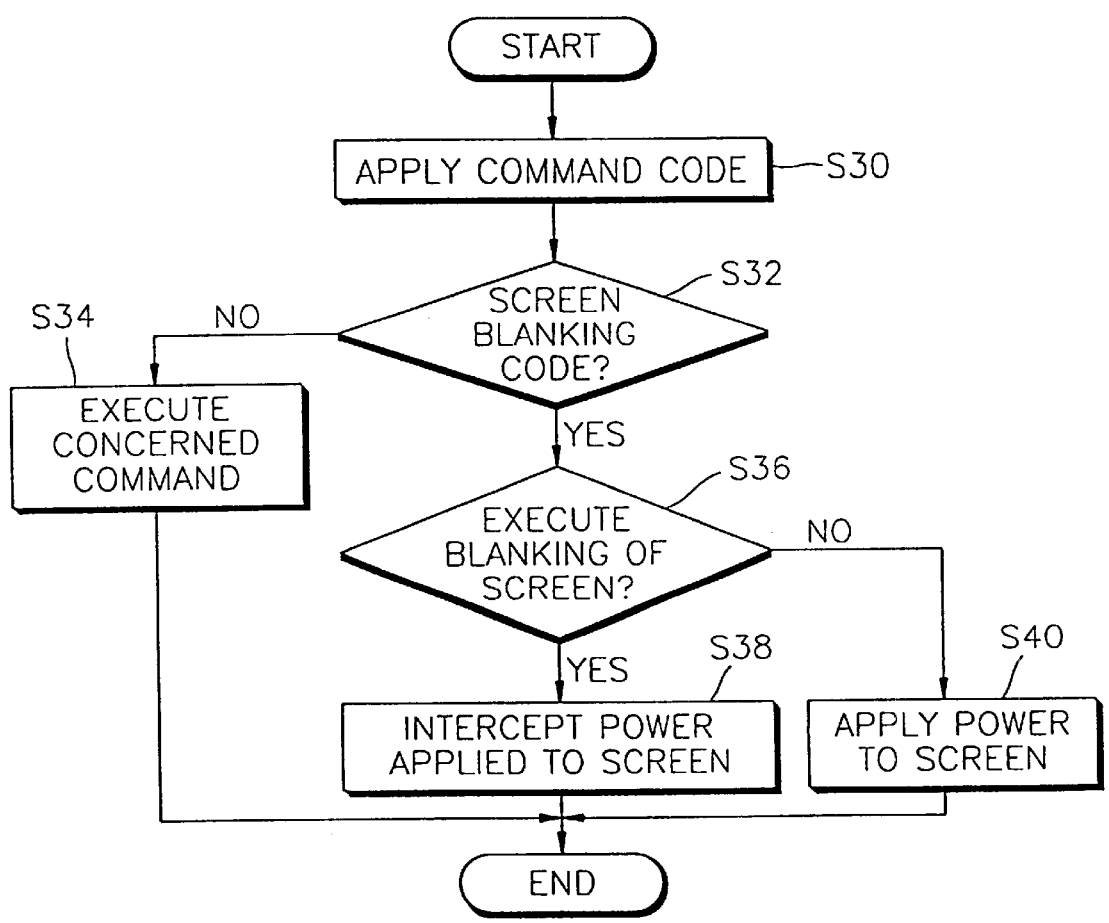
FIG. 3 is a flow chart for describing a screen blanking method according to the present invention.

FIG. 3 is a flow chart for describing a screen blanking method according to the present invention.

First, a command is applied (step 30). It is then determined whether the command applied in step 30 is a screen blanking code (step 32). If, during step 32, it is determined that the code applied is not a screen blanking code, an operation according to the concerned command is executed (step 34). Because the execution of the concerned command has nothing to do with the present invention, a detailed description thereof has not been provided.

When the command is a screen blanking code as determined during step 32, it is then determined whether the screen blanking code is a screen blanking execution code (step 36). When the screen blanking code is a screen blanking execution code as determined during step 36, power to the screen is suspended (or "intercepted") (step 38). When the screen blanking code is a screen blanking cancellation code, power is applied to the screen (step 40).

The above-mentioned present invention can be applied to all image reproducing apparatuses.

As mentioned above, it is possible to save power supplied to the screen in the image reproducing device having a screen blanking function according to the present invention. Also, the image reproducing apparatus has a simple structure.

Although the invention has been described by way of a preferred embodiment, it will be understood by those of skill in the art that various modifications may be made to the described embodiment without departing from the spirit and scope of the invention.

This application is based on Korean Patent Application No. 97-60615, which is incorporated by reference herein for all purposes.

What is claimed is:

1. An image reproducing apparatus having a screen blanking function, the apparatus comprising:

a command applying circuit for producing image blanking execution codes and image blanking cancellation codes;

a screen blanking determining circuit for determining whether a screen of the image reproducing apparatus is to be blanked according to a code produced by the command applying circuit; and a screen power controlling circuit for controlling power supply provided to the screen according to the determined result of the screen blanking determining circuit, wherein the image reproducing apparatus further comprises a sound mute determining circuit which causes sound to be output from the image reproducing apparatus even in the event a sound mute execution code is applied from the command applying circuit so long as the image reproducing apparatus is in a state in which the screen is blanked.

2. A screen blanking method of an image reproducing apparatus, the method comprising the steps of:

(a) determining what type of code is applied from a command applying circuit of the image reproducing apparatus;

(b) causing power to a screen of the image reproducing apparatus to be suspended when the code is determined in step (a) to be a screen blanking execution code; and (c) causing power to be applied to the screen when the code is determined in step (a) to be a screen blanking cancellation code, wherein sound is output from the image reproducing apparatus even in the event a sound mute execution code is applied from the command applying circuit so long as the image reproducing apparatus is in a state in which the screen is blanked.

* * * * *